(12) United States Patent
Lekutai

(10) Patent No.: US 10,869,276 B1
(45) Date of Patent: Dec. 15, 2020

(54) IDLE VEHICLE COMMUNICATION BASED ON AVAILABLE ENERGY RESOURCES

(71) Applicant: T-Mobile USA, Inc., Bellevue, WA (US)

(72) Inventor: Gaviphat Lekutai, Kirkland, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/531,523

(22) Filed: Aug. 5, 2019

(51) Int. Cl.
| | |
|---|---|
| *H04W 52/02* | (2009.01) |
| *H04W 4/40* | (2018.01) |
| *H04W 88/06* | (2009.01) |
| *H04W 4/44* | (2018.01) |
| *H04W 4/90* | (2018.01) |

(52) U.S. Cl.
CPC ......... *H04W 52/0261* (2013.01); *H04W 4/40* (2018.02); *H04W 4/44* (2018.02); *H04W 52/0258* (2013.01); *H04W 4/90* (2018.02); *H04W 88/06* (2013.01)

(58) Field of Classification Search
CPC ......... H04W 52/0261; H04W 52/0258; H04W 4/44; H04W 4/40; H04W 4/90; H04W 88/06
USPC ........................................ 455/574
See application file for complete search history.

(56) References Cited

U.S. PATENT DOCUMENTS

| | | | |
|---|---|---|---|
| 8,660,549 B2* | 2/2014 | Hrabak | H04W 52/0277 455/419 |
| 10,140,784 B1 | 11/2018 | Philosof et al. | |
| 2008/0015748 A1* | 1/2008 | Nagy | G07C 5/008 701/31.4 |
| 2011/0164594 A1* | 7/2011 | Stahlin | H04W 48/12 370/338 |
| 2012/0177061 A1* | 7/2012 | Stahlin | H04L 67/12 370/467 |
| 2013/0078945 A1* | 3/2013 | Lavi | H04W 84/22 455/410 |
| 2014/0244104 A1* | 8/2014 | Tan | H04B 1/3822 701/36 |
| 2015/0032291 A1* | 1/2015 | Lowrey | G01C 21/26 701/2 |
| 2015/0244826 A1* | 8/2015 | Stenneth | H04L 67/322 709/213 |
| 2015/0279125 A1* | 10/2015 | Chronowski | H04L 67/12 701/29.2 |
| 2018/0109937 A1 | 4/2018 | Lee et al. | |

FOREIGN PATENT DOCUMENTS

WO  2016209022 A1  12/2016

* cited by examiner

*Primary Examiner* — William Nealon
(74) *Attorney, Agent, or Firm* — Han Santos, PLLC; Nabil A. Abdalla

(57) ABSTRACT

Idle vehicles have limited energy resources for onboard systems during idle periods. Devices and techniques for processing data generated from sensors on board the vehicle and transmitting the information in the form of a V2X message is accomplished by determining a method for transmitting the message using the lowest energy consuming method available to the vehicle. Where energy resources are below a threshold value the vehicle may store the message until energy resources are at a critical level or may look for new, lower energy transmission methods at intervals until the message may be distributed to another network connected device.

20 Claims, 6 Drawing Sheets

IDLE VEHICLE COMMUNICATION BASED ON AVAILABLE ENERGY RESOURCES

BACKGROUND

Advancement in vehicle autonomy through next generation communication networks and on-vehicle sensors are enabling vehicles to collect more information about their surroundings even when the vehicle is not in use or idle. For an operating vehicle, sensor information may be leveraged to make vehicle systems more autonomous and improve safety by enabling operation of the vehicle independent of a vehicle operator or assisting the vehicle's operator in decision making to respond more quickly to sensed changes in the vehicle's surroundings. Idle vehicle information may further improve the safety of the vehicle and its surrounding's by providing additional safety-related information to other nodes of the vehicle's network.

Vehicle-to-everything (V2X) communications are enabling rapid deployment of information over far reaching networks. Advancements in V2X communications has been driven by implementation standards focused primarily on vehicles in motion. In particular, V2X implementation standards such as $3^{rd}$ Generation Partnership Project (3GPP), 5G Automotive Association (5GAA), and Intelligent Transportation System (ITS) standards organizations focus largely on standard message types for vehicles in motion. V2X messages are leveraged by vehicle operators and vehicle systems as additional information to improve autonomy and safety by providing information pertaining to the future location of the vehicle (e.g., traffic conditions). V2X technology has enabled road safety applications such as forward collision warnings, emergency vehicle approaching, roadworks warning, etc.

Idle vehicles operate under finite energy resources and as V2X communications become more prevalent, and in particular V2X communication while the vehicle is idle, sophisticated energy conservation schema will be required to manage the limited energy resources onboard the idle vehicle.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
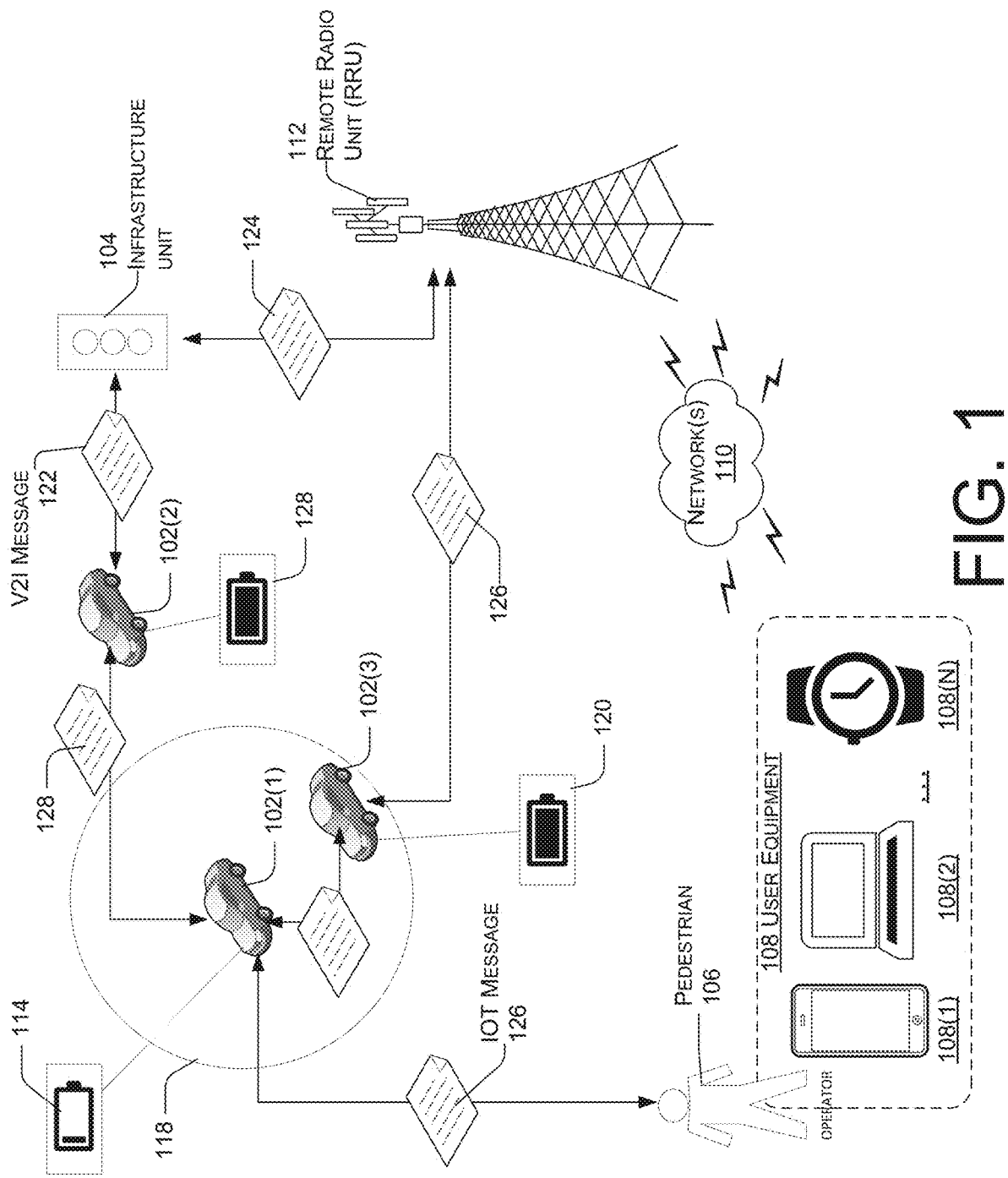
FIG. 1 illustrates an example V2X network to connect vehicles (V2V), infrastructure (V2I), cellular tower(s) (V2N), and user devices (e.g., V2P) for transmission and reception of idle vehicle messages.

This disclosure is directed to systems and methods for transmitting Vehicle to Everything (V2X) and autonomous communications to and from a vehicle that is at rest or idle. Transmission of the communication may be accomplished over a radio uplink and radio downlink directly from the idle vehicle to a local radio tower. Alternatively, the V2X communication may be transmitted directly to a neighboring vehicle via a PC5 Vehicle to Vehicle (V2V) communication (i.e., sidelink). V2X-type communications are regulated through industry accepted standards such as 3GPP, 5GAA, and ITS standards. These standards focus on vehicle safety when the vehicle is in motion, but not idle. During motion the vehicle is actively generating energy to support system operations, including V2X transmission. Standards (e.g., 3GPP, 5GAA, and ITS) do not generally contemplate the type or need for messages transmitted from a vehicle at rest or idle, however vehicles at rest may experience a myriad of conditions which, if shared with a broader network of vehicles and operators, may improve safety of the user and the autonomy of the vehicles. Idle vehicles may not be actively generating energy for vehicle operations, however, including transmission of V2X messages and therefore advanced energy conservation schema is required to enable idle vehicle V2X transmissions with limited energy resources.

In various embodiments, the idle vehicle may act as a forward source of information for autonomous vehicles by sending relevant or requested information to the idle vehicle before the idle vehicle arrives in a location. In other embodiments, the idle vehicle may provide information regarding the safety of an incapacitated driver, or a condition where the vehicle's operator or passengers may be at risk (e.g., sensor information indicating the rapid approach of another vehicle). In still further embodiments, the idle vehicle may provide information to a network of security vehicles (e.g., police, ambulance, fire, etc.) pertaining to conditions at or near the source of an event (e.g., fire, robbery, break-in, etc.). The systems and techniques described herein may be implemented in a number of ways. Several exemplary implementations are provided below with reference to the following FIGS. 1-6.

Definitions

V2X means vehicle-to-everything communications. V2X communications include communication to and from a vehicle via onboard equipment to all other systems in a distributed network, including for example: V2I, V2V, V2P, and V2N.

V2I means vehicle-to-infrastructure communications. V2I communications may be established via short-range communications link such as Wi-Fi, Bluetooth, or Uu interface. Examples of infrastructure may include roadside units, connected signs, connected stop lights, connect cross walk signals, etc.

V2V means vehicle-to-vehicle communications. V2V communications may be established by, for example, a PC5 connection to one or more vehicles in a range of the vehicle.

V2P means vehicle-to-pedestrian communications. V2P communications may be established between a vehicle and some user equipment (UE) such as a mobile phone, smart watch or other mobile/handheld device. The device may or may not be associated with a pedestrian.

V2N means vehicle-to-network communications. V2N systems connect the vehicle to cellular infrastructure, such as a remote radio unit, typically via Uu interface.

ITS means Intelligent transportation systems and includes key components, such as vehicle ad hoc networks (VANETs) established between, for example, V2V communications.

V2X Network Embodiments

FIG. 1 illustrates an example V2X network to connect vehicles (V2V), infrastructure (V2I), cellular tower(s) (V2N), and user devices (e.g., V2P) for transmission and reception of idle vehicle messages. The system 100 may include one or more idle vehicles 102(1), 102(2), 102(3) capable of sending and receiving messages to and from a wider network. The system 100 may further consist of connected infrastructure units such as the stop light 104. Infrastructure units may also include cross-walk signals, road signs, etc. The infrastructure unit 104 may communicate on the network by acting as a relay or as sources of information for the network. For example, an idle vehicle 102(3) may transmit a message (V2I communication) to a connected infrastructure unit 104 and the connected infrastructure unit 104 may then transmit the message to a remote radio unit 112 for processing and/or transmission to the wider network 110. In another example, the infrastructure unit 104 may have one or more sensors to generate messages that may be provided to the idle vehicle 102(3) to inform the idle vehicle 102(3) of its surroundings.

In some embodiments, one or more pedestrians 106 may also be connected to the network via a connected device. A pedestrian 106 may interact with one or more user equipment 108(1)-108(N) of the network (e.g. using a mobile phone, operating a vehicle, etc.). The user equipment 108(1)-108(N) may include, for example, devices such as the mobile phone 108(1), computing device 108(2), or smart watch 108(N). The user equipment 108(1)-108(N) may connect to a remote network via a cellular radio connection (e.g., Uu interface) or indirectly through a Wi-Fi, Bluetooth, or similar distributed network. Cellular communications may connect to the network by direct communication with a remote radio unit 112 or indirectly by relaying information to the network via one or more V2X communication through a relaying device(s). The relaying device may be one, two, three, or more devices (e.g., vehicle 102 or user equipment 108). The relaying device(s) may establish a connection to the remote radio unit 112 and ultimately the network 110.

An idle vehicle 102 connected to the system 100 may have one or more onboard sensors capable of gathering information about the idle vehicle and the environment surrounding the idle vehicle. For example, the idle vehicle 102(1) may have an internal and/or external temperature sensor, one or more Light Detection and Ranging (LiDAR) units for detection motion and objects near the idle vehicle 102, a video camera and/or microphone to collect video and audio information from the idle vehicle's cabin or external to the idle vehicle. Additionally, the idle vehicle may include a sensor for determining the energy capacity and remaining energy of a battery onboard the vehicle.

In an embodiment the idle vehicle 102(1) detects the availability of one or more transmitting devices in a proximity of the idle vehicle 102(1). The one or more transmitting device may be, for example, a second vehicle 102(3) in motion or idle, an infrastructure unit 104, or a user equipment 108. The idle vehicle 102(1) may store a record of available transmitting devices and proximity to the idle vehicle 102(1). In still further embodiments, the proximity of the one or more transmitting devices may be used to determine the lowest energy relay option under the condition that the idle vehicle's battery 114 does not have sufficient available energy to transmit a communication directly to the remote radio unit 112.

In one embodiment, an idle vehicle 102(1), having insufficient battery resource 114 to transmit a message 116 directly to a remote radio unit 112, may identify one or more second vehicles 102(3) within a predefined proximity range 118. If the one or more second vehicles 102(3) has sufficient battery resources 120 to relay the message 116 the first vehicle 102(1) may transmit the message 116 to the second vehicle 103(3) via a lower energy transmission method relative to a cellular transmission, such as a PC5 (V2V) communication. The second vehicle 102(3) may then transmit the message 116 to a remote radio unit 112. In still further embodiments, the idle vehicle 102(1) may identify a pedestrian having one or more user equipment 108(1)-108(N) within the predefined proximity range 118 and transmit the message 116 to the user equipment 108(1)-108(N) to relay to the network 110 or be utilized at the connected infrastructure unit 104. In still further embodiments, the idle vehicle may identify a connected infrastructure unit 104 within predefined proximity range 118 and transmit the message 116 to the connected infrastructure unit 104 to relay to the network 110 or be consumed at the connected infrastructure unit 104.

In still further embodiments a third vehicle 102(2), having an onboard energy storage 128 and may identify an infrastructure unit 104 capable of sending and receiving the message 122 at the idle vehicle 102(1) using a V2I connection such as e.g., a radio communication. The infrastructure unit 104 may then relay the message 124 using a wired or wireless (e.g., radio) communication to the remote radio unit 112. The infrastructure unit 104 may be, for example, a stop light, cross walk light, roadway signage or other roadway infrastructure with wireless or wired connectivity.

In some embodiments, a pedestrian 106 is present in the idle vehicle or near the idle vehicle 102(1). In further embodiments the pedestrian may be located within a predefined proximity range 118 to the idle vehicle 102(1). In still further embodiments the pedestrian 106 may be the operator of the idle vehicle 102. The pedestrian 106 may further be associated with one or more user equipment 108 also within the predefined proximity range 118 such as a mobile device or internet-of-things (TOT) connected device. More particularly, the user equipment 108 may be, for example, a mobile phone 108(1), laptop computing device 108(2), or smart watch 108(N). These devices may have direct connectivity to a remote network 110. User equipment 108 may also be tethered or connected to another device that relays the signal via Wi-Fi or Bluetooth, for example. The idle vehicle 102(1) may send a message 126 to the user equipment 108 via a PC5 connection (V2P), for example a Bluetooth or Wi-Fi connection.

The network 110 may include public networks such as the Internet, private networks such as an institutional and/or personal intranet, or some combination of private and public networks. The network 110 can also include any type of wired and/or wireless network, including but not limited to local area network (LANs), wide area networks (WANs), satellite networks, cable networks, Wi-Fi networks, Wi-Max networks, mobile communications networks (e.g. 3G, 4G, and so forth), or any combination thereof. Moreover, the mobile communications network may facilitate communications in accordance with one or more technical standards such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth.

Figure 2:
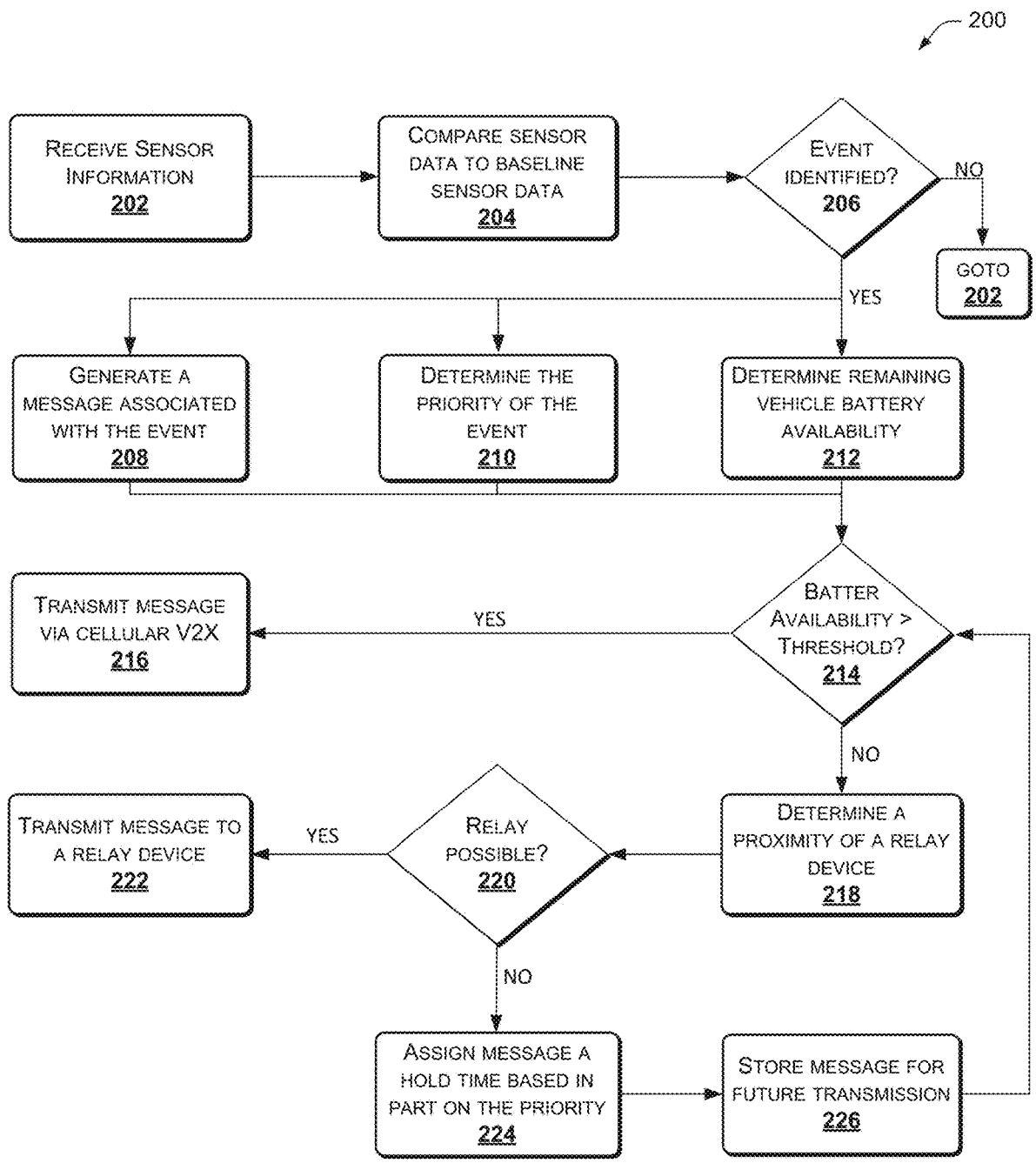
FIG. 2 illustrates a process for transmitting V2X messages using the lowest energy method available, including performing analysis of sensor data to identify an event and assign a priority to the event.

FIG. 2 illustrates a process 200 for transmitting V2X messages using the lowest energy method available, including performing analysis of sensor data to identify an event and assign a priority to the event. The priority assigned to the event may reflect the severity or urgency associated with the message. For instance, if the message involves information about the imminent harm to an occupant of the vehicle or a pedestrian it may be associated with a high priority. If, however, the message involves routine information about the vehicle it may be associated with a lower priority than the even associated with potential harm to an occupant of the vehicle.

A vehicle's onboard V2X controller may receive sensor information at step 202 from one or more sensors onboard the vehicle. In some embodiments, the V2X controller may also receive sensor information for another connected device (e.g., connected infrastructure, another vehicle, or another device). In still further embodiments, the V2X controller may extract sensor information from a message received from the network.

The onboard vehicle sensors may include, for example, automobile system sensors that measure pressure (e.g., tire and tank), temperature, oxygen, liquid level (oil, fuel, tank), tank leakage diagnostics, and tire pressure. Additional advanced driver assistance sensors such as LiDAR, collision avoidance systems, traffic sign recognition, blind spot detection, reversing and parking aids and lane departure warning systems may all provide additional information about the idle vehicle's surroundings (both interior and exterior to the idle vehicle).

At step 204 the V2X controller may process the sensor data continuously or at periodic intervals to identify a feature or combination of features that indicates an event of interest has occurred. An event of interest may include, for example: vehicle break-in, vehicle stolen, vehicle alarm (either the vehicle itself or a nearby vehicle), vehicle in danger condition (e.g., another vehicle approaching the idle vehicle at a speed over a threshold condition), a vehicle disturbances/intrusion, etc. The V2X controller may process the sensor information by comparing any individual sensor data set to a baseline data set associated with the same sensor. A deviation from the baseline that is greater than a threshold may indicate that an event of interest has occurred. In some embodiments, the threshold deviation may vary depending on a combination of sensor events received at the V2X controller. For example, a V2X controller may identify a vehicle break-in condition when the vehicle's sensors detect: 1) movement or the presence of a pedestrian near the vehicle, and 2) an audio signature of glass breaking or the sensor detecting glass breaking that is greater than the static condition of the vehicle's sensors. The combination of sensor data may be correlated to a vehicle break-in event at 206. If no event is identified at step 206 the V2X controller may receive additional sensor information at a later time.

In some embodiments the event may be identified as a result of an impact to the idle vehicle greater than a threshold value, an airbag deployment, a fire, an unauthorized or forced entry, an operator or passenger indicated emergency, unauthorized vehicle movement, or a vehicle alarm.

If an event is identified at step 206 the V2X controller may take additional steps of: 1) generating a message associated with the event at step 208, 2) determining the priority of the message at step 210, and 3) determining the remaining vehicle battery availability at step 212.

At step 208 the V2X controller may generate a message associated with the event. For example, if the event is associated with a vehicle break-in, the V2X controller may generate a message indicating that the vehicle has detected a vehicle break-in, the message may further characterize the break-in based on the signature of the event, such as a glass break-in, forced entry, or entry via nonverified key. The message may also be appended with sensor information. For example, a car break-in message may be appended with audio information or with video of the car break-in event.

At step 210, the V2X controller may determine the priority of the message. The priority of the message may be correlated to the severity or urgency of the event associated with the sensor data. For instance, a vehicle break-in event associated with the operator or a passenger present in the idle vehicle may have a higher severity than a break-in with no occupants in the vehicle. In another example, the message may be assigned a higher priority if the event has happened more than one time over a predetermined amount of time (e.g., multiple break-ins over a short duration of time or multiple vehicles in a near proximity detecting the same events in a predetermined period of time). In still further embodiments, a message indicating an eminent collision event may have a higher priority if there is a passenger or an operator in the idle vehicle than if no human is present in the idle vehicle associated with the eminent collision event. The priority may be used at the remote radio unit 112 when allocating processing resources and transmission resources: a higher priority message will get a larger percentage of resources and priority transmission capacity.

In some embodiments the priority of the event may be determined based on the presence of one or more of: an operator in or near the idle vehicle, an intervention by an operator or pedestrian at the time of the event, the duration of the event, or a vehicle type associated with the idle vehicle (e.g., civilian, police, ambulance, fire, etc.), where emergency vehicles have a higher priority than a civilian vehicle.

The V2X controller may further determine the remaining onboard battery availability at step 212. The remaining battery availability may be determined based on battery sensor data generated directly from the vehicle's onboard battery, historic use data, or a combination of sensor and historic use data. Vehicle battery availability and/or the assigned message priority are used to determine when and by what mode (e.g., cellular, Bluetooth, etc.) the message is transmitted to the network.

At step 214 the remaining battery availability from step 212 is compared to a threshold energy value. The threshold energy value may be a value associated with a minimum energy capacity that the vehicle system may not go below. For example, a car battery may have an average capacity of 48 amp-hours, meaning that it can delivery 1 amp for 48 hours. The threshold energy value may be a fraction of the total energy capacity of a battery or a system. In some instances, the threshold energy value may be 5-10% of the total system energy capacity. In other instances, the threshold energy value may be 10-15%. In still others, the threshold energy value may be 15-20%, 20-25%, or 25 or more percentage of the total system energy capacity. If the remaining battery availability is greater than a threshold energy value the V2X controller may transmit the message via a cellular V2X (i.e., cellular radio transmission) to a remote radio unit 112 at step 216.

In some instances, the threshold energy value may be dynamic and may vary depending on one or more factors including the historic vehicle energy consumption rate (i.e., historic power usage), the priority of the message, the amount of energy required to transmit a message, and the availability of an alternate transmission method (e.g., nearby relay device such as a user equipment 108, another vehicle 102(2), or an infrastructure unit 104 capable of relaying the message). In an embodiment, the threshold energy value may be low, e.g. twenty percent of full capacity, when the idle vehicle's historic usage data indicates that the next vehicle operation is eminent. In another embodiment, the threshold energy value may be high, e.g., eighty percent of full capacity, when the idle vehicle has recently initiated an historically long idle period and the vehicle has detected one or more relaying devices within range of a lower energy transmission method (e.g., WiFi or Bluetooth).

If, at step 214, the V2X controller determines that the battery has insufficient availability, based on remaining energy and a threshold energy value, to transmit the message via a c-V2X transmission (i.e., the energy available is less than the threshold energy value), the V2X controller may, at step 218, determine the proximity of one or more relay devices. A relay device may be, for example, a user equipment 108 such as a mobile phone 108(1), mobile device 108(2), IOT connected device, or smart watch 108(N).

The V2X controller may, at step 220, determine that a relay communication is possible at a lower energy consumption than a c-V2X transmission, but which is still below a minimum energy threshold. Additionally, or alternately, the V2X controller may set the threshold energy availability at an ultimate minimum—a level which the transmission may not deplete energy availability below except in the highest priority events. If the V2X controller identifies a relay device within a threshold proximity to the idle vehicle and where transmission of the message to the relay device will not deplete the available battery energy reserve below a threshold level, the V2X controller may transmit the message to the relay device at step 222.

If the V2X controller determines that a relay is not possible at step 220, the V2X controller may assign to the message a hold time based at least in part on the priority of the message. The hold time is the duration that the V2X controller stores the message before attempting to transmit the message at a later time via any transmission method (i.e., the V2X controller returns to step 214). For instance, if the priority of the message is high, the V2X controller may assign a short time interval to the message. At step 226 the V2X controller may store the message for future transmission and attempt to transmit the message after the time interval has expired by returning to step 214. If the priority of the message is low, the V2X controller may assign a hold time that is longer than for a high priority message. In one embodiment, the V2X controller may transmit a high priority message by any method when the remaining battery resources reach a critical level (e.g., a high priority message may be transmitted via c-V2X radio transmission if the vehicle's battery resource reach a critically low level). The critical level may be the last remaining energy stored in the battery, or a minimum level that the vehicle cannot go below to maintain critical services to the idle vehicle. The critical level may also be determined based on historic usage data of the idle vehicle while the vehicle is idle as well as the typical duration the vehicle is idle.

Figure 3:
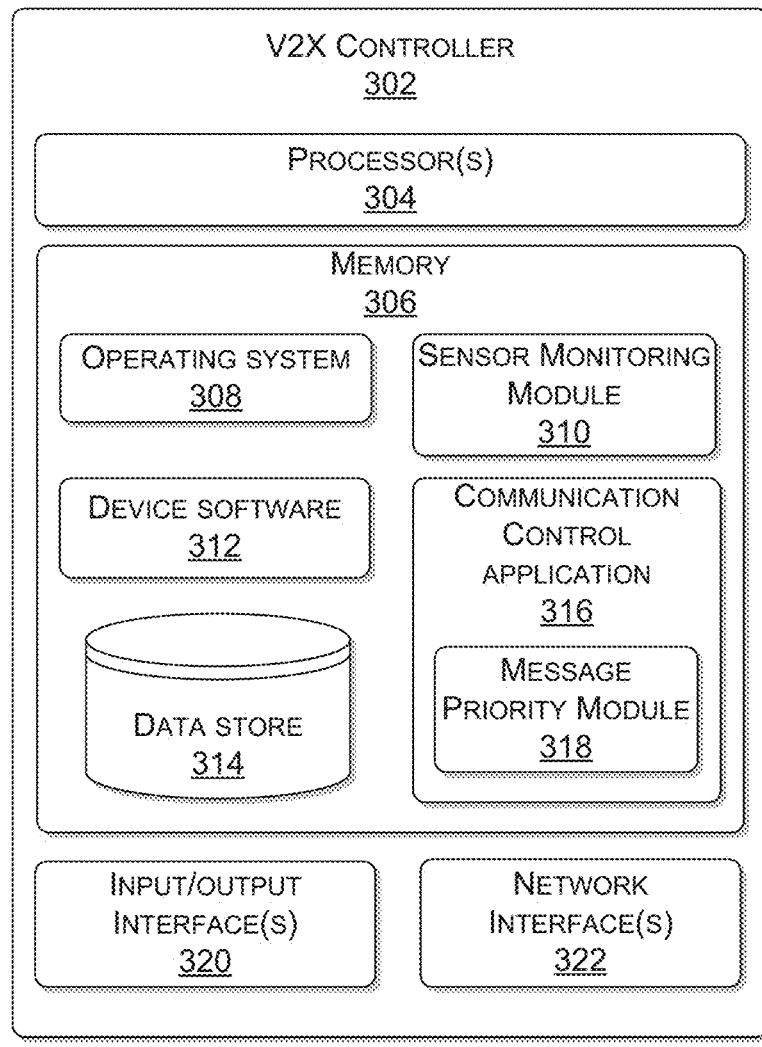
FIG. 3 is a block diagram of an example V2X controller of an idle vehicle, generating and transmitting a mobile communication with optimized energy expenditure.

FIG. 3 is a block diagram of an example V2X controller 302 of an idle vehicle, generating and transmitting a mobile communication with optimized energy expenditure. The V2X controller 302 may include processor(s) 304 to receive data from one or more sensors onboard the idle vehicle. The processor(s) 304 may facilitate a process 200 such as the one described in FIG. 2 where sensor information is received and analyzed to identify an event of interest and associate a priority with the event. The processor(s) 304 may then direct the transmitting of a message associated with the event; the transmission mode depending on one or more characteristics of the idle vehicle such as remaining battery and the priority associated with the message. In at least one example, the processor(s) 304 may be a central processing unit(s) (CPU), graphics processing unit(s) (GPU), or both a CPU and GPU or any other sort of processing unit(s). Each of the one or more processor(s) 304 may have numerous arithmetic logic units (ALUs) that perform arithmetic and logical operations as well as one or more control units (CUs) that exact instructions and stored content from processor cache memory and then execute these instructions by calling on the ALUs as necessary during program execution. The processor(s) 304 may also be responsible for executing all computer applications stored in the memory 306, which may be volatile (such as RAM), non-volatile (ROM) memory.

The processor(s) 304 may be operably connected to memory 306 of the V2X controller 302. In some examples, memory 306 may include system memory which may be volatile (such as RAM), non-volatile (such as ROM, flash memory, etc.) or some combination of the two. The memory 306 may also include additional data storage 314 (e.g., removable and/or non-removable) such as, for example, magnetic disks, optical disks, or tape memory. The memory 306 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

The memory 306 may direct critical functions of the V2X controller 302. For instance, the memory 306 may further include an operating system 308, sensor monitoring module 310, device software 312, data storage 314, communication control application 316, and message priority module 318. The operating system 308 may be capable of managing computer hardware and software resources.

The sensor monitoring module 310 may be configured to monitor and retrieve sensor data from one or more sensor(s) positioned onboard the idle vehicle. The one or more sensor(s) may gather information about the idle vehicle's systems and the environment surrounding the idle vehicle. For example, the idle vehicle may have an internal and/or external temperature sensor, one or more Light Detection and Ranging (LiDAR) units for detection motion and objects near the vehicle, a video camera and/or microphone to collect audio and/or video information from the vehicle's cabin or external to the vehicle. Additionally, the vehicle may include a sensor for determining the capacity and remaining energy of a battery onboard the vehicle.

The sensor monitoring module 310 may monitor and retrieve sensor data from each, or certain number of sensor(s) on a continuous basis, per a predetermined schedule, or in response to an event. The predetermined schedule may be based on a time interval of thirty minutes, one, twelve, or twenty-four hours, however any time interval is possible. Additionally, the event may be a based on current sensor data that indicates an event has occurred or an active engagement between an operator or passenger of the vehicle and the V2X controller system (e.g., a panic button onboard the vehicle).

The sensor monitoring module 310 may be configured to analyze sensor data and determine that an event has occurred, the event being associated with the idle vehicle. In one example, the sensor monitoring module 310 may determine that the vehicle is being vandalized based on sensor data that indicates a physical disturbance with the vehicle, sounds associated with the event, and/or video indicating the same.

Additionally, the sensor monitoring module 310 may further generate an analysis model by correlating historical sensor data associated with one or more event(s). The sensor monitoring module 310 may continuously evaluate historical sensor data to progressively refine the analysis model. As additional historical event-associated sensor data becomes available, a more accurate analysis model may be developed.

Furthermore, the sensor monitoring module 310 may employ one or more trained machine learning algorithms to determine a similarity between the current sensor data and data-points of the analysis model. In doing so, the sensor monitoring module 310 may infer the occurrence of an event based at least in part on the similarity being greater than or equal to a predetermined similarity threshold. The similarity may be determined by measuring the Euclid distance between the current sensor data and data-points of the analysis model.

The device software 312 may include software components that enable the V2X controller 302 to perform functions, such as input/output of sensor data; analysis and transmission of communication data; and, the software may further be responsible for executing the operating system 308 of the V2X controller 302.

The communication control application 316 may be configured to generate and transmit a V2X message to a network. More particularly, the communication control application 316 may receive, from the sensor monitoring module 310, a notification that an event has occurred. The communication control application 316 may generate a message associated with the event, such as "car break-in". The communication control application 316 may further append the message with additional information such as the date, time, location, and other metadata associated with the event. In some instances, the message may include audio, video, picture, and/or map data associated with the event and appended to the message.

The communication control application 316 may further receive, from the message priority module 318, a priority score associated with the message. The priority may reflect the severity of the event or the urgency of communicating the message to the network. The communication control application 316 may additionally receive directly from the idle vehicle's energy source or from the sensor monitoring module 310 an indication of the remaining energy (e.g., battery life) of the idle vehicle's energy supply.

The communication control application 316 may be configured to determine whether the remaining energy is greater than a threshold value and sufficient to transmit a message via the vehicle's cellular communication adapter. The communication control application 316 may further adjust the threshold value based on historic energy consumption rates of the vehicle during idle operation. The threshold value may be further adjusted based on the historic vehicle use data. For example, if the vehicle is typically operated and regenerating battery energy every morning at 6:00 a.m. the communication control application 316 may lower the threshold as the current time approaches 6:00 a.m. To modify the threshold value, the communication control application may generate an analysis model by correlating energy availability and use data with time. Additionally, the communication control application 316 may employ a trained machine learning algorithm to determine an association between the energy availability, consumption rate, and the day or week and/or time of the day. Where the communication control application 316 determines that the vehicle's energy source has sufficient energy resources, the communication control application 316 may direct the transmission of the message to a remote network via the network interface(s) of the V2X controller 302.

In some instances, the communication control application 316 may be further configured to identify one or more devices within a threshold proximity to the idle vehicle. In one embodiment the communication control application 316 may identify an infrastructure device within the threshold proximity, such as a smart traffic signal or connected sign. In other embodiments, the communication control application 316 may identify a vehicle within the threshold proximity of the idle vehicle. In still further embodiments, the communication control application 316 may identify a user equipment within the threshold proximity. The user equipment may be a mobile device such as a mobile phone or laptop or a connected device such as a smart watch.

The communication control application 316 may be further configured to prioritize the transmission of the message to one or more of the connected infrastructure or user equipment devices within the threshold proximity. The communication control application 316 may determine the transmission mode requiring the lowest energy based on an indication of the vehicle's remaining energy, the likelihood that energy will be regenerated in the near future and/or the priority associated with the message. In some embodiments, the communication control application 316 may receive a second message from a connected device, the second message being associated with an event and a nearby vehicle. The communication control application may analyze the message and event to adjust the priority of the message. For example, if the idle vehicle receives a second message that indicates a vehicle in a nearby proximity experienced a break-in event, the idle vehicle may increase the priority of a message associated with a break-in event to reflect the likelihood that a third vehicle may experience a similar event in the near future.

In one embodiment, the communication control application 316 identifies a connected device within the threshold proximity and, having sufficient energy resources onboard the idle vehicle, transmits the message to the connected device. The connected device may relay the message via its network or if the connected device is a nearby vehicle, the nearby vehicle may consume the information and make its own determination to transmit the message or not. This mesh network of connected devices may be used to efficiently communicate information over large networks of connected vehicles and devices.

In other embodiments, the communication control application 316 may determine that there are insufficient energy resources and/or no connected device within the proximity of the idle vehicle. The communication control application may assign a hold time to the message based at least in part on the priority associated with the message. The hold time represents an interval when the communication control application 316 will reevaluate the ability of the V2X controller 302 to attempt to transmit the message. The communication control application 316 may store the message in the data store 314 until the hold time is lapsed at which time the communication control application 316 may analyze conditions for transmission. For high priority message, such as an "operator at risk" message the hold time may approach zero (e.g., thirty seconds or one minute). For lower priority messages the hold time may be thirty minutes or one hour.

The message priority module 318 may be configured to associate a priority with the message. The priority may be determined based at least in part by the event. For recurring event types, the message priority module 318 may employ a look up table to associate a priority value with an event. The baseline priority value may be increased or decreased from the baseline value as a result of the intensity of the sensor data associated with the event. For instance, if a particular event is associated with a window breaking sound captured by a microphone, a higher intensity sound than the baseline value may result in a higher priority from the baseline. Similarly, a lower intensity window-breaking sound relative to the baseline may result in a lower priority value than the baseline value.

In some embodiments, the baseline multiplier may be between one (1) and two (2) for events with higher intensity sensor data than the baseline. In still further embodiments, the baseline multiplier may be greater than zero (0) and less than one (1) for events with sensor data that is lower intensity than the baseline event.

In some embodiments the priority value may be determined based at least in part on a history of events associated with a current location of the idle vehicle. For instance, a location or a proximity to a location with a high number of safety-related events may result in a higher baseline multiplier. In other embodiments, the number of events in a proximity of the idle vehicle may increase or decrease the priority multiplier. For instance, in one non-limiting example, an idle vehicle may be parked in a location associated with a number of car break-ins in the last thirty days. The priority multiplier may be 1.5 for an event detected and associated with a car break-in within the location. In another non-limiting embodiment, the same idle vehicle in the high priority location detects an event associated with a car break-in and the idle vehicle V2X controller has also received a message from a nearby vehicle or device reporting a break-in within close proximity to the idle vehicle. The message priority module 318 may associate a priority multiplier of 1.8 to the message of a car break-in detected.

In some embodiments, the message priority module 318 may receive a second message from a connected device via the communication control application 316, the second message being associated with an event and a nearby vehicle. The communication control application may analyze the message and event to adjust the priority of the message. For example, if the idle vehicle receives a second message that indicates a vehicle in a nearby proximity experienced a break-in event, the idle vehicle may increase the priority of a message associated with a break-in event to reflect the likelihood that a third vehicle may experience a similar event in the near future.

The V2X controller 302 may further comprise input/output interfaces 320 to support connection of a peripheral device to the controller 302 or to conduct maintenance of the controller 302.

The V2X controller 302 may also include the network interface(s) 322. The network interface(s) 322 may include any kind of transceiver known in the art. For example, the network interface(s) 322 may include a radio transceiver performing the function of connecting to a remote network via a Uu cellular connection for transmitting and receiving radio frequency communications via an antenna. In addition, the network interface(s) 322 may also include a wireless communication transceiver and near-field antenna for communicating over unlicensed wireless Internet Protocol (IP) networks, such as local wireless data networks and personal area networks (e.g., Bluetooth or near field communication (NFC) networks). Further examples of the network interface (s) 322 may include wired communication components, such as an Ethernet port or a Universal Serial Bus (USB).

Figure 4:
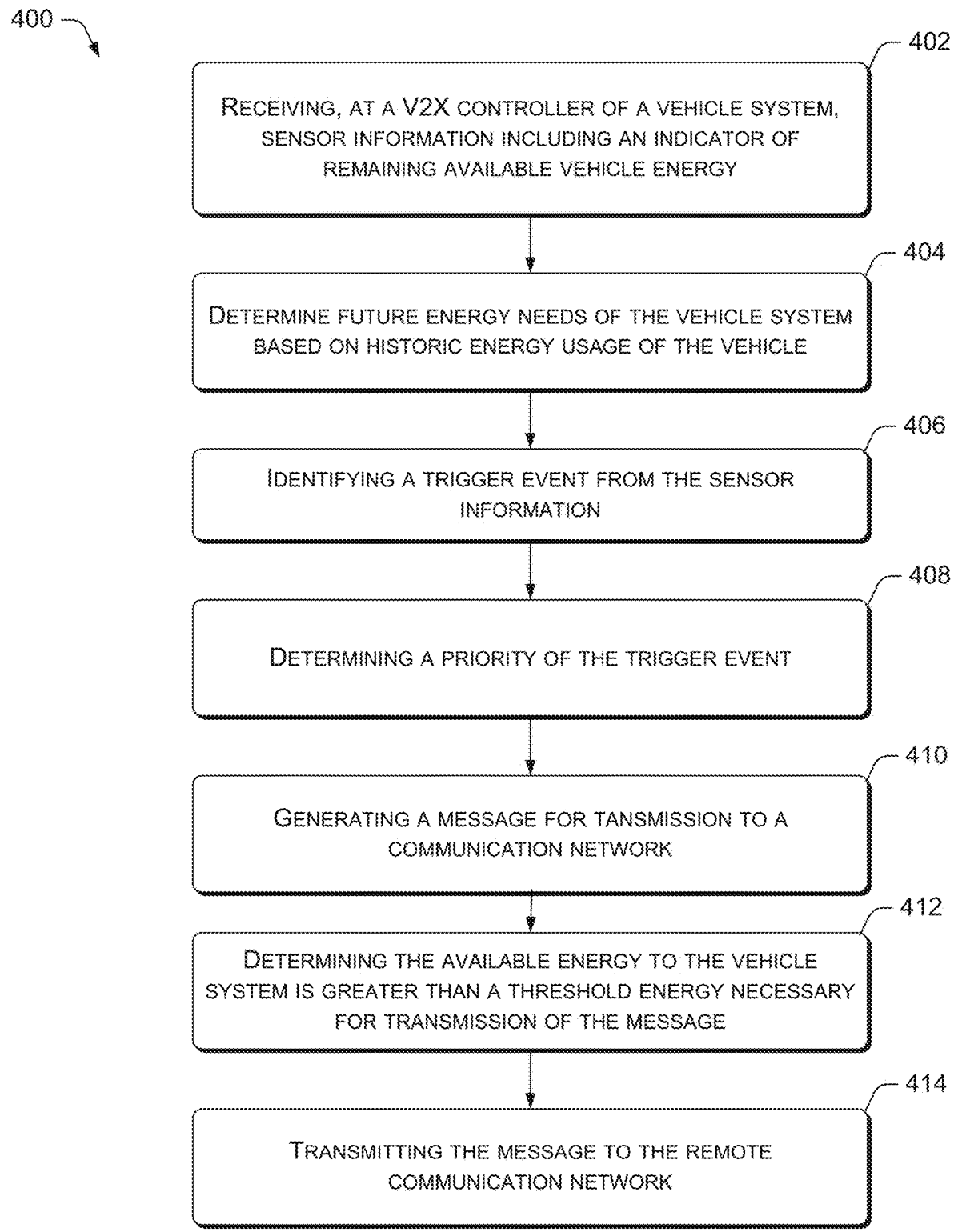
FIG. 4 illustrates a V2X controller process to generate and transmit a message to a remote communication network utilizing minimal energy resources.
Figure 5:
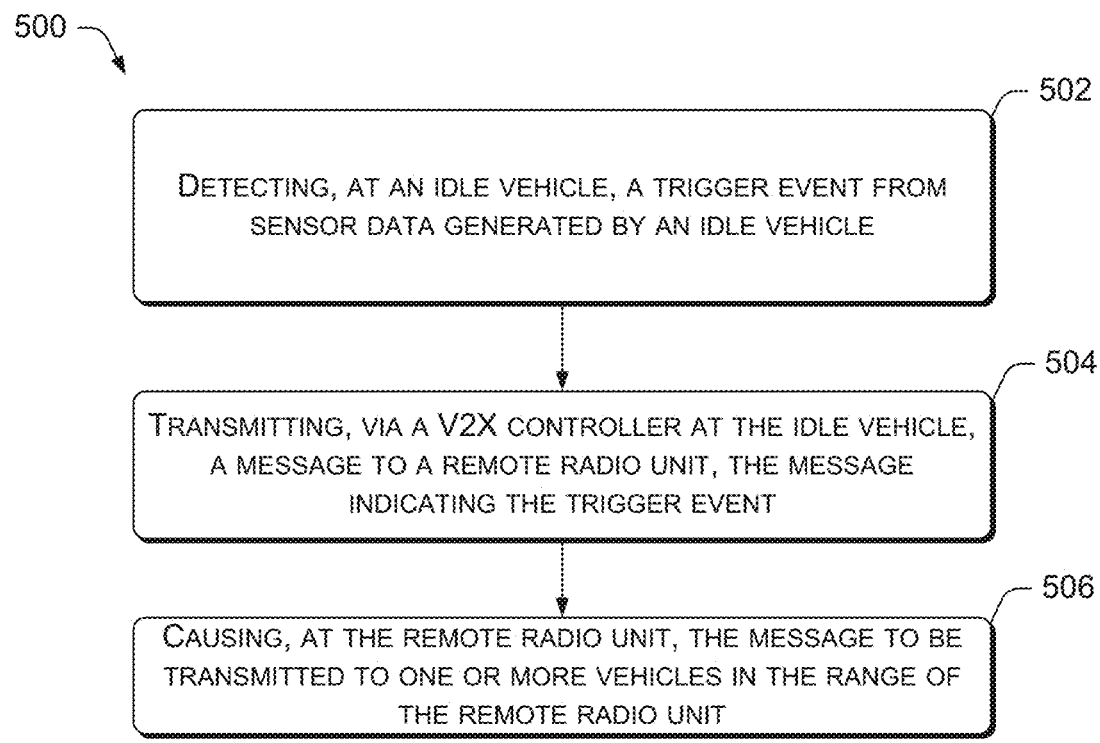
FIG. 5 illustrates a method for causing a V2X message to be transmitted to one or more vehicles in the range of a remote radio unit.
Figure 6:
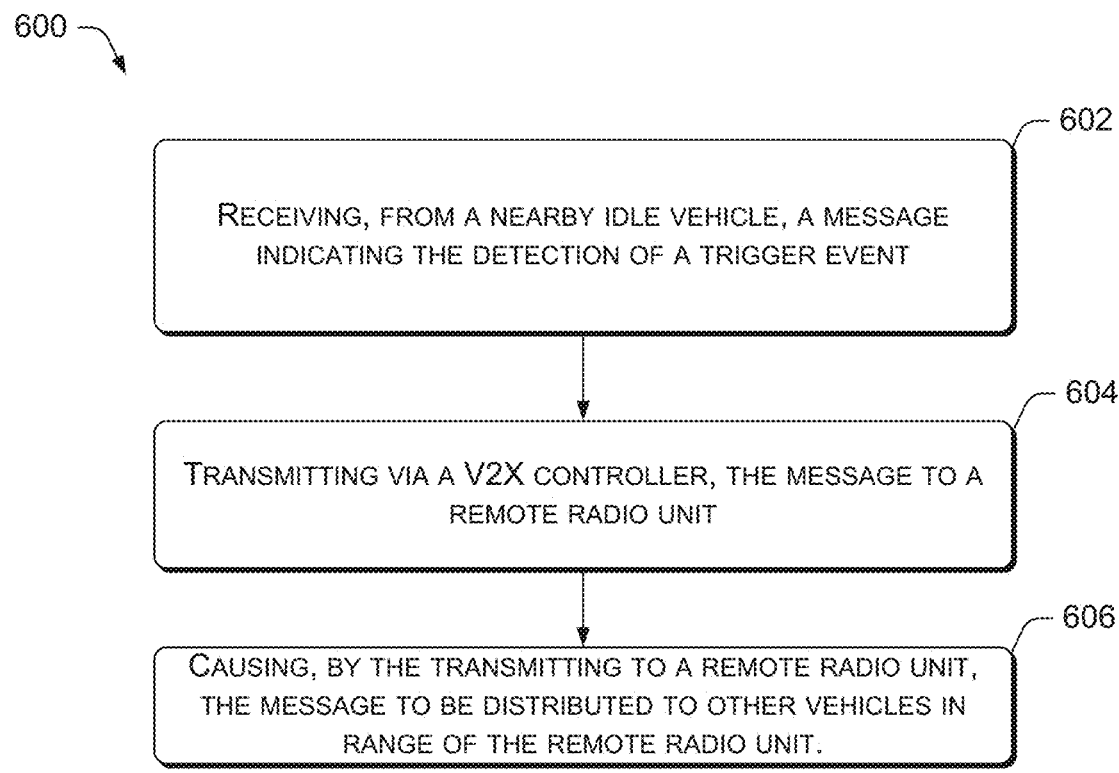
FIG. 6 illustrates a method for causing a V2X message to be transmitted to one or more vehicles in the range of a remote radio unit under mode 4 transmission standards.

FIGS. 4, 5, and 6 represent processes 400, 500, and 600 that relate to operations of the V2X controller. Each of the processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the example architecture 100 of FIG. 1.

FIG. 4 illustrates a V2X controller process 400 to generate and transmit a message to a remote communication network utilizing minimal energy resources. The message may be transmitted via the lowest energy consuming method, or if the V2X controller determines sufficient energy resources are available, the message may be transmitted via the most direct route. Typically, the most direct route is directly to a remote radio unit (RRU) 104.

At step 402 the V2X controller may receive sensor information from one or more sensors onboard an idle vehicle. The sensor information may include at least an indicator of the remaining vehicle energy. In at least one example, energy resources for the idle vehicle are stored in the idle vehicle's onboard battery. Sensor data may be generated from onboard sensors including, for example, automobile system sensors that measure pressure (e.g., tire and tank), temperature, oxygen, liquid level (oil, fuel, tank), tank leakage diagnostics, tire pressure. Additional advanced driver assistance sensors such as LiDAR, collision avoidance systems, traffic sign recognition, blind spot detection, reversing and parking aids and lane departure warning systems may all provide additional information about the idle vehicle's surroundings (interior and exterior to the vehicle).

At step 404 the V2X controller may determine the future energy requirements of the idle vehicle systems based on historic energy usage of the idle vehicle. In one non-limiting embodiment the V2X controller may further generate an analysis model by correlating historical energy usage data over time. The V2X controller may continuously evaluate historical energy usage data to progressively refine the analysis model. As more historical data becomes available, a more accurate analysis model may be developed. In one embodiment the V2X controller may employ one or more trained machine learning algorithms to determine a nominal energy consumption rate over time.

At step 406 the V2X controller may identify an event from the sensor information. The V2X controller may monitor and retrieve sensor data from each, or from a certain number of sensor(s) on a continuous basis, per a predetermined schedule, or in response to a known event. The predetermined schedule may be based on a time interval of thirty minutes, one, twelve, or twenty-four hours; however, any time interval is possible. Additionally, the event may be based on current sensor data that indicates an event has occurred or an active engagement between an operator or passenger of the vehicle and the V2X controller system (e.g., a panic button onboard the vehicle).

At step 408 the V2X controller may determine a priority associated with the event. In some instances, the priority of the message may be correlated to the severity or urgency of the event associated with the sensor data. For instance, a break-in event may have a higher severity if the event is detected while a passenger or operator is still present in the automobile. In another example, the message may be assigned a higher priority if the event has happened more than one time over a predetermined amount of time (e.g., multiple break-ins over a short duration of time or multiple vehicles in a near proximity detecting the same events in a predetermined period of time). In still further embodiments, a message indicating an eminent collision event may have a higher priority if there is a passenger or operator detected in the idle vehicle.

At step 410 the V2X controller may generate a message for transmission to a remote communication network. The message may include a description of the detected event, a priority/or and appended information such as the date, time, and location of the event. In some embodiments, the message may be appended with audio or video recordings (i.e., sensor information) associated with the event. In still further embodiments, the message may be appended with an indicator of the idle vehicle type, such as passenger car, van, emergency vehicle, etc.

At step 412 the V2X controller is configured to determine the optimal mode for message transmission. In some instances, the V2X controller may transmit directly to a remote radio unit 112. In one embodiment, the V2X controller may identify one or more transmitting devices within a predetermined proximity of the idle vehicle and transmit the message to the transmitting device to be relayed to the remote network. Several non-limiting examples of a nearby relay device may be a second vehicle 102(3) (idle or in motion), a user equipment 108(1)-108(N) such as a mobile device (laptop, mobile phone, smart watch, etc.), or a connected deice such as a connected infrastructure 104 (traffic signal, sign, etc.).

In one embodiment, the V2X may establish a threshold energy level that the energy supply cannot fall below. The threshold energy level may be a dynamic level determined by the V2X controller based on historic energy consumption rates of the vehicle and conditions associated with the vehicle. For instance, the V2X controller may generate a model by correlating historical energy consumption data which is also associated with one or more conditions of the idle vehicle such as time of day, average time between operations of the idle vehicle (energy generation mode), likely duration of the next operation of the idle vehicle, etc. The V2X controller may continuously evaluate historical energy use data to progressively refine the analysis model. As more historical data becomes available, a more accurate analysis model may be developed, and the dynamic threshold set more accurately.

In still further instances, the V2X controller may employ one or more trained machine learning algorithms to determine a dynamic threshold level based at least in part on the similarity between the dynamic threshold and data-points of the analysis model. In doing so, the V2X controller may infer the dynamic threshold based at least in part on the similarity being greater than or equal to a predetermined similarity threshold. The similarity may be determined by measuring the Euclid distance between the current dynamic threshold and data-points of the analysis model.

At step 414 the V2X controller may transmit the message via the lowest energy consuming method. In some instances, the V2X controller may transmit the message via the most direct route depending on the priority of the message. For instance, a message associated with operator or user safety, such as an accident event or break-in where the operator is detected in the vehicle. In an operator or user safety scenario the vehicle may transmit the message directly to the remote radio unit 104 to ensure that the message is delivered to the remote network as quickly as possible regardless of the energy necessary for transmitting the message.

FIG. 5 illustrates V2X controller process 500 for causing a V2X message to be transmitted to one or more vehicles in the range of a remote radio unit 112. In some instances, the remote radio unit 112 may decide resources (e.g., radio channel, frequency, etc.) necessary to transmit a message. Under 3GPP standards, a mode 3 option allows the remote radio unit 112 to receive a message and allocate the messages to particular vehicles in the range of the remote radio unit 112.

At step 502, an idle vehicle 103(2) may detect an event from sensor data generated by the idle vehicle 103(2). A V2X controller at the idle vehicle 103(2) may transmit a message 126 indicating the event to a remote radio unit 112 at step 504. The remote radio unit 112 may receive the message 126 and allocate the necessary resources to transmit the message back out to a network or remote vehicles. The remote radio unit 112 may allocate resources based on one or more features of the message. For instance, the remote radio unit 112 may determine the number and distance of cars to send the message based on the priority of the message, the location of the originating idle vehicle which may be appended to the message, or an indication of the type of vehicles transmitting the original message (e.g., an emergency vehicle).

FIG. 6 illustrates a method 600 for causing a V2X message to be transmitted to one or more vehicles in the range of a remote radio unit 112 under 3GPP mode 4 transmission standards. In some instances, the remote radio unit 112 may decide resources (e.g., radio channel, frequency, etc.) necessary to transmit a message. Under 3GPP standards, a mode 4 option enables a vehicle 102(3) to receive a message from a nearby vehicle 102(1) and then transmit the message to the remote radio unit 112. The remote radio unit 112 may receive the message and allocate the messages to particular vehicles in the range of the remote radio unit 112.

In one example, under 3GPP standards, a mode 4 transmission option enables an idle vehicle to allocate resources (e.g., radio channel, frequency, etc.) to transmit a V2V messages to a nearby vehicle (e.g., 1:1 V2V link or 1:n V2V links). At step 602 a vehicle may receive, from a nearby idle vehicle, the message indicating the detection of an event by a sensor of the idle vehicle. At step 604 the vehicle may transmit, via a V2X controller, the message to a remote radio unit 112. At step 606 the remote radio unit 112 may transmit the message to one or more other vehicles in the range of the remote radio unit 112. The remote radio unit 112 may receive the message and allocate the necessary resources to transmit the message to a network of connected vehicles. The remote radio unit 112 may allocate resources based on one or more features of the message. For instance, the remote radio unit 112 may determine the number and distance of cars to send the message based on the priority of the message, the location of the originating idle vehicle which may be appended to the message, or an indication of the type of vehicles transmitting the original message (e.g., an emergency vehicle).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A vehicle system, comprising:
   one or more onboard sensors capable of measuring conditions of the vehicle system; and
   a V2X controller comprising:
     one or more processors;
     memory coupled to the one or more processors, the memory having one or more instructions stored therein, the one or more instructions, when executed by the one or more processors, cause the one or more processors to perform acts comprising:
       storing, in the memory, a baseline set of sensor data from the one or more onboard sensors, the baseline set of sensor data representing a nominal idle condition of the vehicle system;
       receiving and storing in the memory a second set of sensor data from the one or more onboard sensors representing a current state of the vehicle system, the second set of sensor data including an indication of a remaining capacity of a battery onboard the vehicle system;
       analyzing, by the one or more processors, the second set of sensor data relative to the baseline set of sensor data to infer an event, the event representing a change to the current state of the vehicle system;
       determining, by the one or more processors, a predicted energy consumption of one or more transmission methods for a communication that includes at least a portion of the second set of sensor data;
       selecting, by the one or more processors, a selected transmission method of one or more transmission methods for the communication, based at least in part on the predicted energy consumption;
       determining, by the one or more processors, a priority of the event; and
       determining, based at least on the priority of the event and the remaining capacity of the battery, whether to transmit a communication via the selected transmission.

2. The vehicle system of claim 1, wherein the event is further identified by detecting one or more of: an impact to the vehicle system greater than a threshold value, an airbag deployment, a fire, an unauthorized or forced entry, an operator or passenger indicated emergency, unauthorized vehicle movement, or a vehicle alarm.

3. The vehicle system of claim 1, wherein the priority of the event is further determined based on one or more of: a presence of an operator, an intervention by an operator at a time of the event, a duration of the event, or a vehicle type associated with the vehicle system.

4. The vehicle system of claim 1, further storing instructions that, when executed cause the one or more processors to perform acts comprising:
   in response to the predicted energy consumption of the selected transmission method being less than or equal to a predetermined threshold, transmitting the communication via the selected transmission method.

5. The vehicle system of claim 1, further storing instructions that, when executed cause the one or more processors to perform acts comprising:
   in response to the predicted energy consumption of the selected transmission method being greater than a predetermined threshold, identifying one or more connected devices within a predetermined proximity to the vehicle system to receive the communications via a cellular V2X signal.

6. A method for transmitting a vehicle communication, comprising:
   analyzing, by a processor, sensor information including information indicating remaining energy resources of a vehicle system;
   determining, by the processor, an energy consumption demand for the vehicle system based on historic energy consumption data stored in a memory of the vehicle system;
   determining, by the processor, that an event has occurred within a predetermined proximity of a vehicle associated with the vehicle system;
   assigning, by the processor, a priority to the event, the priority associated with an urgency of transmitting a message to individual nodes of a network associated with the vehicle system;
   generating, by the processor, the message related to the event;
   determining, by the processor, a predicted energy consumption of one or more transmission methods for the message, based at least in part on the energy consumption demand; and
   selecting, by the processor, a transmission method of the one or more transmission methods for the message based at least in part on the predicted energy consumption of the transmission method, the sensor information indicating the remaining energy resources of the vehicle system, and the priority associated with the event.

7. The method of claim 6, wherein determining that an event has occurred further comprises comparing the sensor information to historic baseline sensor data to identify a deviation from the historic baseline sensor data that is greater than a predetermined threshold deviation.

8. The method of claim 6, wherein the generating the message further comprises appending the message with one or more of: the priority associated with the event, sensor data associated with the event, an intended destination of the message, or further instructions for transmitting the message.

9. The method of claim 6, wherein selecting the transmission method further comprises:
- determining a threshold energy value based at least in part on the historic energy consumption data associated with the vehicle system, wherein the threshold energy value is an amount of energy that the vehicle system is to conserve; and
- comparing the remaining energy resources available to the vehicle system to the threshold energy value, and wherein, selecting the transmission method is further based at least in part on a comparison of the remaining energy resources to the threshold energy value.

10. The method of claim 9, wherein the remaining energy resources is less than the threshold energy value, the method further comprising:
- determining that no connected device is within a transmission range associated with the transmission method relative to the vehicle system; and
- storing the message for a time.

11. The method of claim 9, wherein the remaining energy resources is less than the threshold energy value, the method further comprising:
- identifying one or more connected devices within a transmission range associated with the transmission method relative to the vehicle system;
- determining a predicted energy consumption value of the one or more connected devices to transmit the message to an intended destination;
- identifying a connected device of the one or more connected devices to transmit the message, the connected device having the least predicted energy consumption value of the one or more connected devices that, do not deplete the remaining energy resources available to below the threshold energy value; and
- transmitting the message to the connected device.

12. The method of claim 11, wherein the intended destination of the message is associated with a safety of the vehicle and the message is intended to be delivered to one or more connected devices in a proximity to the vehicle.

13. The method of claim 11, wherein the message is delivered to the connected device within the transmission range of a low energy transmission capability of the vehicle and the message is appended with instructions to relay the message to a remote radio unit for further processing and transmission to additional connected devices within the transmission range of the remote radio unit.

14. A device for controlling communications of a vehicle, comprising:
- one or more sensors;
- one or more processors;
- memory coupled to the one or more processors, the memory including one or more modules that are executable by the one or more processors to:
  - receive sensor information from one or more sensors including at least an indication of a remaining battery capacity available to vehicle resources;
  - determine a predicted energy consumption of one or more transmission methods for a message to a remote network;
  - select a selected transmission method of the one or more transmission methods for the message, based at least in part on the predicted energy consumption;
  - determine, based at least in part on the remaining battery capacity, a time to transmit the message to the remote network; and
  - transmit, at the time and via the selected transmission method, the message to the remote network.

15. The device of claim 14, wherein the remote network is a remote radio unit and wherein the modules are further configured to:
- generate computer-executable instructions for delivery with the message that cause the message to be transmitted to other vehicles in range of the remote radio unit.

16. The device of claim 14, wherein the modules are further configured to:
- identify, based on the sensor information and historic data associated with the sensor information, an event to communicate to an external network; and
- associate, with the message, a priority, the priority based at least in part on the sensor information received from the one or more sensors.

17. The device of claim 14, wherein the modules are further configured to:
- determine a proximity relative to the vehicle for transmission of the message, based at least in part on the remaining battery capacity available to the vehicle resources; and
- identify, one or more connected devices within the determined proximity that is capable of receiving the message.

18. The device of claim 17, wherein the one or more connected devices are configured to receive the message, the one or more connected devices to include: a second vehicle, another vehicle in motion, a user equipment, a connected infrastructure, or a remote radio unit.

19. The device of claim 18, wherein the user equipment is one of a smart watch, a mobile phone, a tablet, or a computing device.

20. The device of claim 18, wherein the connected infrastructure is one of a connected traffic control device, a connected stop sign, a road side sensor, or embedded road sensors.

* * * * *